UNITED STATES PATENT OFFICE.

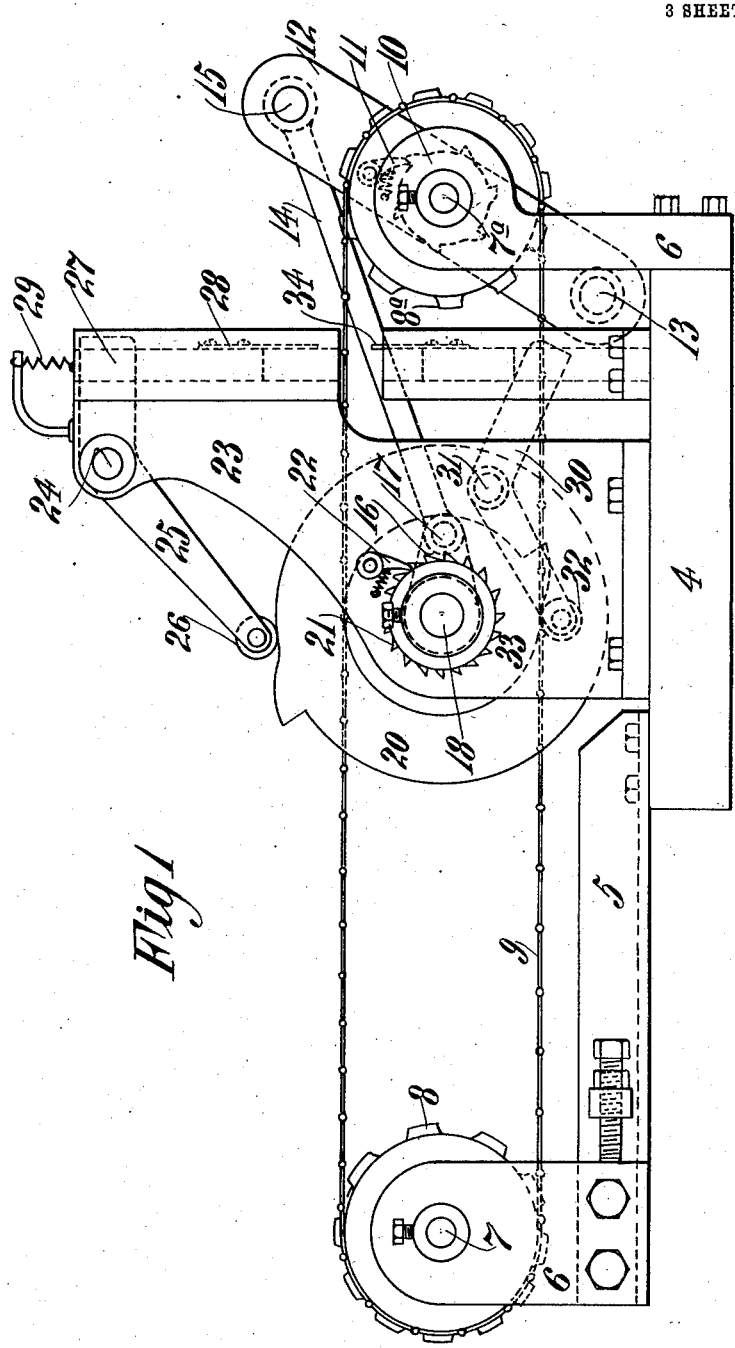

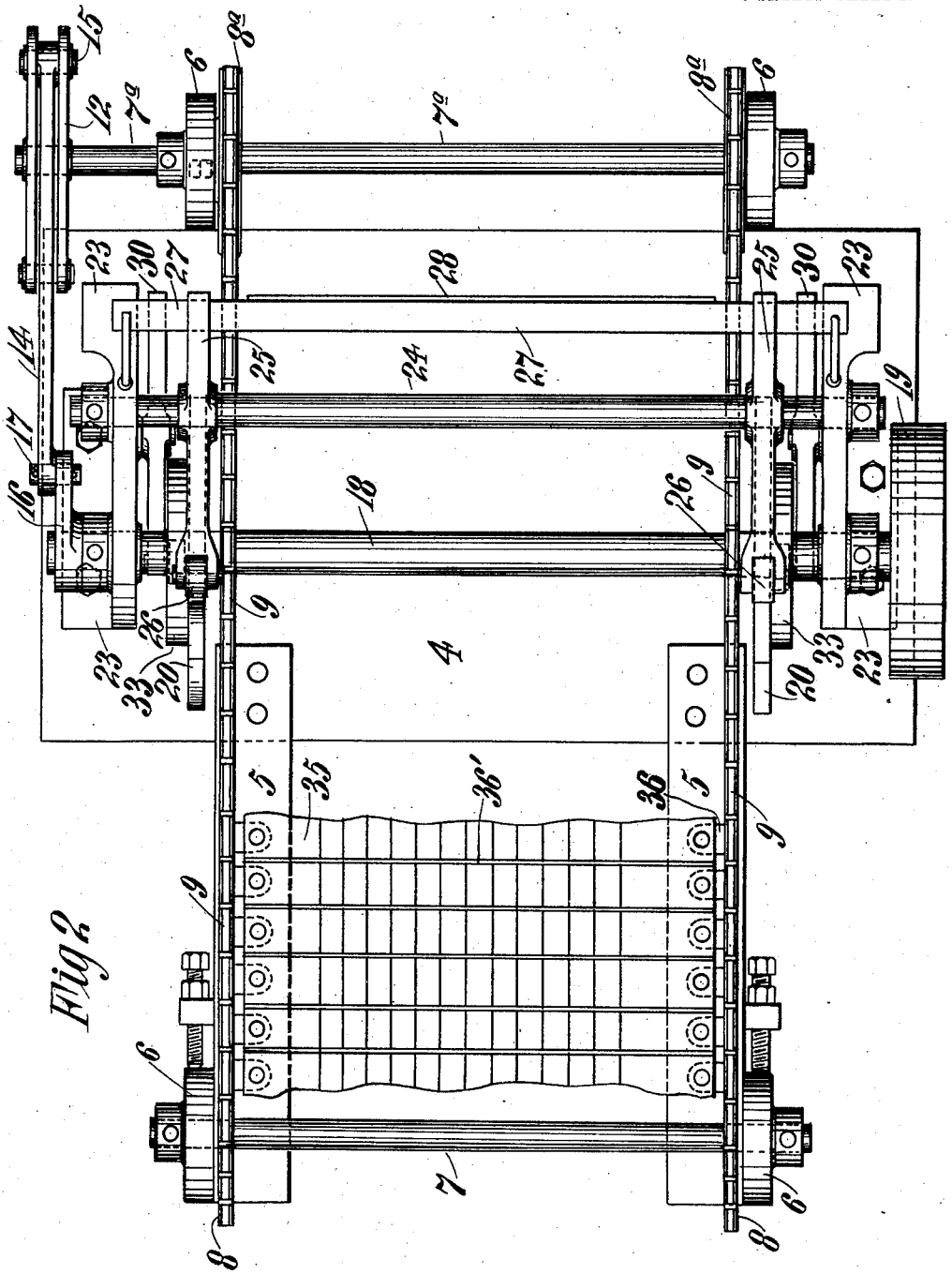

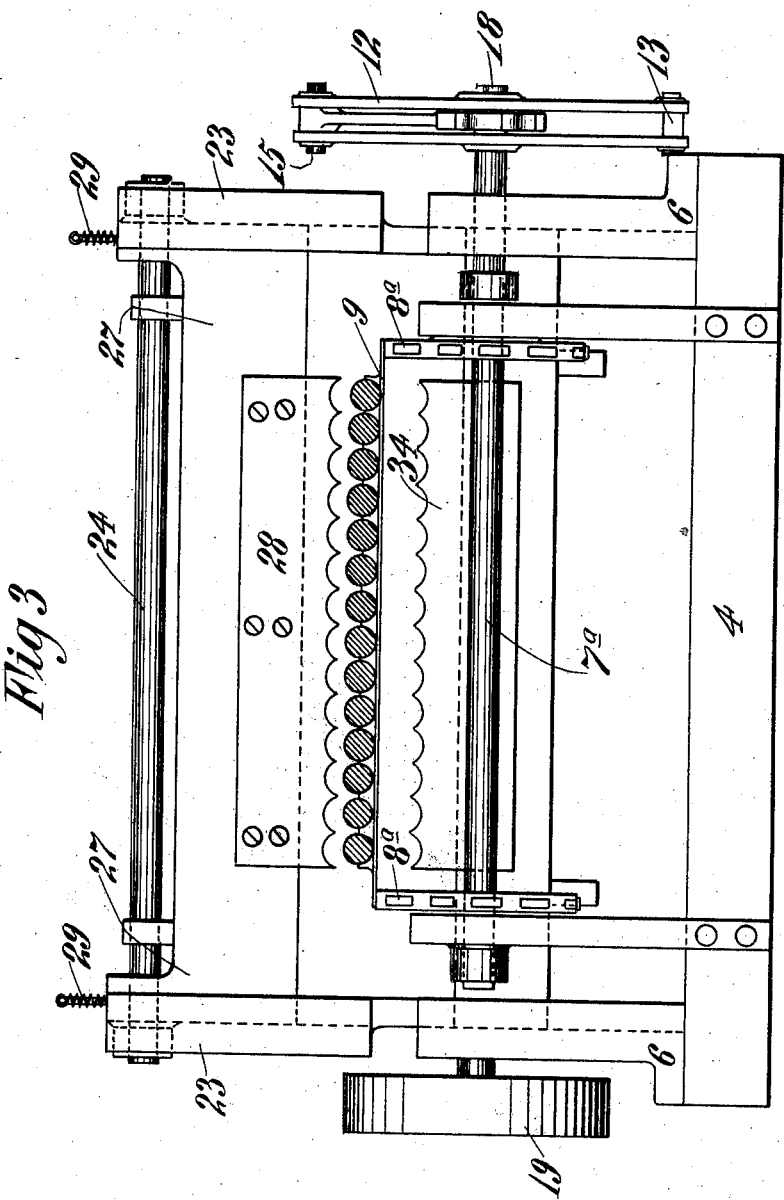

GODFREY P. SCHMIDT, OF NEW YORK, N. Y., ASSIGNOR TO HAZLITT A. CUPPY, OF NEW YORK, N. Y.

CUTTING MACHINERY.

1,025,927.     Specification of Letters Patent.     Patented May 7, 1912.

Application filed July 1, 1910. Serial No. 569,941.

*To all whom it may concern:*

Be it known that I, GODFREY P. SCHMIDT, a citizen of the United States, residing at New York city, in the county of New York and State of New York, have invented certain new and useful Improvements in Cutting Machinery, of which the following is a specification, reference being had therein to the accompanying drawing.

My invention relates to improvements in cutting machinery and has particular reference to a machine adapted for use in cutting plastic material such as chewing gum.

Referring to the accompanying drawings, Figure 1 is a side elevation of a machine illustrating an application of my invention. Fig. 2 a plan view of the same, and Fig. 3 an end view looking from right to left at Fig. 1.

4 is the base or support of the machine.

5 are angle irons or other suitable framework attached to the base 4 and providing with said base support for the standards 6 serving as a bearing for the shafts 7—7ª upon which are mounted the sprockets 8—8ª carrying the chain 9. The shaft 7ª is also provided with the ratchet wheels 10 adapted to be operated by the pawl 11 secured to the rocking lever 12 pivoted to the frame of the machine at 13. This lever 12 is operated by the rod 14 connected therewith at 15 and connected to the crank 16 by the pin 17.

18 is the main shaft preferably driven by a pulley such as 19. Upon this shaft is also mounted the cam 20 and the ratchet wheel 21.

22 is another pawl secured to the framework 23.

24 is a rocking shaft in the frame 23 supporting the levers 25, having rollers 26 adapted to ride upon the cams 20 and provided with a slide 27 adapted to depress the cutter 28 against the action of the spring 29 which tends to keep the cutter elevated. Another lever 30 is pivotally mounted on the framework 23 at 31 and is provided with a roller 32 adapted to ride upon the cam 33.

This lever 30 tends to drive the cutter 34 upwardly to meet the descending cutter 28. The projections on the cams 20 and 33 are positioned diametrically opposite so that it will be observed the cutters 28 and 34 approach and recede simultaneously, the cutter 28 receding under influence of the spring 29, and the cutter 34 under influence of gravity. It will also be observed that the motion of the chain 9 is intermittent, receiving its impulse from the pawl 11 pivoted to the rod 12 which is pushed forward each time the crank 16 turns with the main shaft 18. The chain is also provided with a suitable apron comprising strips 35 which are secured to the links in any suitable manner as by the projections 36. The strips are preferably formed with transverse grooves and are preferably spaced apart slightly as shown by the spaces 36′ so as to allow sufficient clearance for the knives 28 and 34 to cut the gum between the strips as it is fed through the machine.

Of course it will be understood that various modifications may be made without departing from the spirit of the invention as set forth in the claims.

Having described my invention, what I claim as new, and desire to secure by Letters Patent, is:

1. In a machine of the class described, a framework and a pair of sprockets thereupon carrying an endless chain, a driving shaft provided with cams and a crank, a lever pivoted upon said frame and connected to said crank, and means in combination therewith for rotating one of said sprockets, a pair of cutters adapted to travel in a guideway, a pair of levers pivoted upon said frame and adapted to operate said cutters, means in combination therewith whereby said pair of levers are operated by said cams.

2. In a machine of the class described, a framework and a pair of sprockets thereupon carrying an endless chain, a driving shaft provided with cams and a crank, a lever pivoted upon said frame and connected to said crank, and means in combination therewith for rotating one of said sprockets, a pair of cutters adapted to travel in a guideway, a pair of levers pivoted upon said frame and adapted to operate said cutters, and means in combination therewith whereby said pair of levers are operated by said cams, said sprockets rotated intermittently and said cutters operated after each time said sprockets are rotated.

In testimony whereof I affix my signature in presence of two witnesses.

GODFREY P. SCHMIDT.

Witnesses:
 LOUISE ENDERLE,
 THAYOR O. HILL.

Copies of this patent may be obtained for five cents each, by addressing the "Commissioner of Patents, Washington, D. C."